US008186498B2

(12) United States Patent
Kawasaki et al.

(10) Patent No.: US 8,186,498 B2
(45) Date of Patent: May 29, 2012

(54) HANDRAIL FOR PASSENGER CONVEYOR

(75) Inventors: Atsushi Kawasaki, Tokyo (JP); Yuji Kawamura, Saitama (JP)

(73) Assignees: Mitsubishi Electric Corporation, Tokyo (JP); Tokan Co., Ltd., Matsudo-shi (JP)

( * ) Notice: Subject to any disclaimer, the term of this patent is extended or adjusted under 35 U.S.C. 154(b) by 207 days.

(21) Appl. No.: 12/663,858

(22) PCT Filed: Jun. 28, 2007

(86) PCT No.: PCT/JP2007/062981

§ 371 (c)(1),
(2), (4) Date: Dec. 10, 2009

(87) PCT Pub. No.: WO2009/001456

PCT Pub. Date: Dec. 31, 2008

(65) Prior Publication Data

US 2010/0181164 A1 Jul. 22, 2010

(51) Int. Cl.
*B65G 15/00* (2006.01)

(52) U.S. Cl. ........................................................ 198/337

(58) Field of Classification Search .................. 198/337
See application file for complete search history.

(56) References Cited

U.S. PATENT DOCUMENTS 2,211,427 A * 8/1940 Margles ........................ 198/331
3,623,590 A * 11/1971 Johnson ........................ 198/337
3,633,725 A * 1/1972 Smith ........................... 198/337
3,688,889 A * 9/1972 Koch et al. .................... 198/337
3,719,265 A * 3/1973 Redding et al. ............... 198/335
3,740,799 A * 6/1973 Earle ............................. 24/33 B
3,809,206 A * 5/1974 Bredehorn et al. ........... 198/323
4,005,773 A * 2/1977 Bouille .......................... 198/335
4,134,883 A * 1/1979 Mendelsohn et al. .......... 528/63
4,469,729 A * 9/1984 Watanabe et al. ............ 428/36.2
4,598,811 A * 7/1986 Hanano et al. ................ 198/335
4,705,155 A * 11/1987 Kanamori ..................... 198/335
4,776,446 A * 10/1988 Fisher et al. .................. 198/337

(Continued)

FOREIGN PATENT DOCUMENTS

JP 50 17750 6/1975

(Continued)

*Primary Examiner* — Joseph A Dillon, Jr.
(74) *Attorney, Agent, or Firm* — Oblon, Spivak, McClelland, Maier & Neustadt, L.L.P.

(57) ABSTRACT

There is provided a handrail for passenger conveyor in which it is possible to give a prescribed strength to a junction of a canvas and it is possible to prevent vibrations and noises which might be generated when a driving roller passes by the junction of the canvas. For this purpose, a canvas is provided along an inner surface of an annular core body having a C-shaped cross section, which is formed from a thermoplastic elastomer material, and a surface of each of adjacent end portions of the canvas in a junction is formed to be indented toward the core body side compared to surfaces of other portions which form an inner surface of a handrail. An application cloth is provided between the end portions of the canvas so as to cover a gap formed between the end portions of the canvas. A surface of a portion of the application cloth corresponding to a flat portion of the core body is arranged to be flush with an adjacent surface of the canvas, whereas a surface of a portion corresponding to a curved portion of the core body is arranged to be indented with respect to the adjacent surface of the canvas.

3 Claims, 4 Drawing Sheets

U.S. PATENT DOCUMENTS

| | | | | | |
|---|---|---|---|---|---|
| RE32,839 | E | * | 1/1989 | Saito et al. | 198/335 |
| 5,033,607 | A | * | 7/1991 | Rivera | 198/335 |
| 5,092,446 | A | * | 3/1992 | Sullivan et al. | 198/323 |
| 5,160,009 | A | * | 11/1992 | Iyoda et al. | 198/337 |
| 5,255,772 | A | * | 10/1993 | Ball et al. | 198/337 |
| 5,275,270 | A | * | 1/1994 | Dobo | 198/337 |
| 5,332,078 | A | * | 7/1994 | Johnson et al. | 198/338 |
| 5,355,990 | A | * | 10/1994 | Pitts et al. | 198/323 |
| 6,237,740 | B1 | * | 5/2001 | Weatherall et al. | 198/337 |
| 6,673,431 | B1 | * | 1/2004 | Ledzinski | 428/292.1 |
| 6,761,259 | B1 | * | 7/2004 | Onodera et al. | 198/335 |
| 7,083,037 | B2 | * | 8/2006 | Durrer et al. | 198/335 |
| 7,200,915 | B2 | * | 4/2007 | Keun | 29/527.1 |
| 7,243,775 | B2 | * | 7/2007 | Novacek et al. | 198/337 |
| 7,341,139 | B2 | * | 3/2008 | Aulanko et al. | 198/335 |
| 7,571,797 | B2 | * | 8/2009 | Lee | 198/335 |
| 7,641,038 | B2 | * | 1/2010 | El-Wardany et al. | 198/335 |
| 8,006,823 | B2 | * | 8/2011 | Holzner et al. | 198/337 |

FOREIGN PATENT DOCUMENTS

| | | |
|---|---|---|
| JP | 52 32069 | 7/1977 |
| JP | 11 79639 | 3/1999 |
| JP | 2006 117329 | 5/2006 |

* cited by examiner

HANDRAIL FOR PASSENGER CONVEYOR

TECHNICAL FIELD

The present invention relates to a handrail used in a passenger conveyor, such as an escalator and a moving walk.

BACKGROUND ART

Usually, handrails having a C-shaped section are used in a passenger conveyor, such as an escalator and a moving walk. This handrail is, for example, composed of a core body formed from a thermoplastic elastomer material and a strip-like tensile body which is provided in the interior of the core body along the longitudinal direction thereof. When the core body is formed from a thermoplastic elastomer material, in general, a reinforcement fabric is not used in the interior of the core body and a canvas having also the function of the above-described reinforcement fabric is provided on the inner surface of the core body having a C-shaped section.

In general, the handrail of a passenger conveyor is fabricated by cutting a handrail main body, which is formed linearly, to a prescribed length and thereafter connecting both end portions of this handrail main body into an annular shape. Therefore, usually, on the inner surface of this connection there is a junction of a canvas (incidentally, because connecting the canvas is performed in parts other than the above-described connection, junctions of the canvas are sometimes present even in parts other than the connection of the handrail).

When both end portions of the handrail main body are connected together by causing the end portions of the canvas to abut each other, forces are concentrated on the above-described junction when the handrail is bent, with the result that cracks might be generated in the core body formed from a thermoplastic elastomer material. To avoid such problems, there have hitherto been adopted reinforcing methods which involve fixing a short application cloth between the adjacent end portions of the canvas by bonding, thereby to cover and hide the boundary of the canvas in the junction (refer to Patent Document 1, for example).

Patent Document 1: Japanese Patent Laid-Open No. 2006-117329

DISCLOSURE OF THE INVENTION

Problems to be Solved by the Invention

In the reinforcing method described in Patent Document 1, to prevent the application cloth provided in the junction of the canvas from being stripped, the application cloth is arranged in such a manner that the surface thereof becomes indented a little toward the core body side compared to an adjacent surface of the canvas. That is, a stepped portion is formed in the junction of the canvas on the inner surface of the handrail. Therefore, this posed the problem that vibrations and noises are generated each time a driving roller of a handrail drive unit passes by the junction of the canvas, making passengers uncomfortable.

The present invention has been made to solve problems as described above, and the object of the invention is to provide a handrail for passenger conveyor in which it is possible to give a prescribed strength to a junction of a canvas and it is possible to prevent vibrations and noises which might be generated when a driving roller passes by the junction of the canvas.

Means for Solving the Problems

A handrail for a passenger conveyor of the present invention is a handrail that comprises an annular core body which is formed from a thermoplastic elastomer material and has a C-shaped cross section by having a flat portion and curved portions provided on both sides of the flat portion, a tensile body provided in the interior of the core body in a longitudinal direction of the core body to give a prescribed tensile strength to the core body, a canvas which has a C-shaped cross section by being provided along an inner surface of the core body and in which a surface of each of adjacent end portions in a junction is formed to be indented toward the core body side compared to surfaces of other portions which form an inner surface of the handrail, and an application cloth which is provided between the end portions of the canvas so as to cover a gap between the end portions of the canvas and in which a surface of a portion corresponding to the flat portion of the core body is arranged to be flush with an adjacent surface of the canvas and a surface of a portion corresponding to the curved portion of the core body is arranged to be indented with respect to the adjacent surface of the canvas.

Also, a handrail for a passenger conveyor of the present invention is a handrail that comprises an annular core body which is formed from a thermoplastic elastomer material and has a C-shaped cross section by having a flat portion and curved portions provided on both sides of the flat portion, a tensile body provided in the interior of the core body in a longitudinal direction of the core body to give a prescribed tensile strength to the core body, a canvas which has a C-shaped cross section by being provided along an inner surface of the core body and in which a surface of each of adjacent end portions in a junction is formed to be indented toward the core body side compared to surfaces of other portions which form an inner surface of the handrail, an application cloth which is provided between the end portions of the canvas so as to cover a gap between the end portions of the canvas and whose surface is arranged to be indented with respect to the adjacent surface of the canvas, and a non-woven fabric which is provided in a portion of the application cloth corresponding to the flat portion of the core body and whose surface is flush with an adjacent surface of the canvas.

Effect of the Invention

According to the present invention, it is possible to give a prescribed strength to a junction of a canvas and it becomes possible to prevent vibrations and noises which might be generated when a driving roller passes by the junction of the canvas.

BRIEF OF DESCRIPTION OF THE DRAWINGS

DESCRIPTION OF SYMBOLS

| | | | | | |
|---|---|---|---|---|---|
| 1 | core body, | 1a | flat portion, | 1b | curved portion, |
| 1c | curved portion, | 2 | tensile body, | 3 | canvas, |
| 3a | end portion, | 3b | end portion, | 3c | curved portion, |
| 3d | curved portion, | 3e | flat portion, | | |
| 4 | application cloth, | 4a | flat portion, | | |
| 4b | curved portion, | 4c | curved portion, | | |
| 5 | non-woven fabric | | | | |

BEST MODE FOR CARRYING OUT THE INVENTION

The present invention will be described in more detail with reference to the accompanying drawings. Incidentally, in each of the drawings, like numerals refer to like or similar parts and overlaps of description of these parts are appropriately simplified or omitted.

First Embodiment

Figure 1:
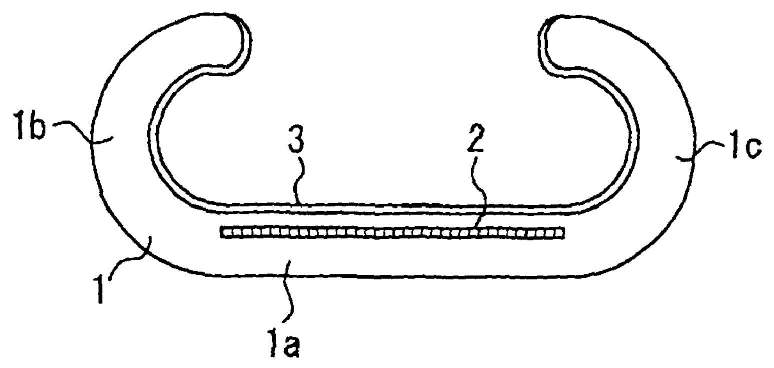
FIG. 1 is a sectional view of a handrail for passenger conveyor in First Embodiment of the present invention.

FIG. 1 is a sectional view of a handrail for passenger conveyor in First Embodiment of the present invention. In FIG. 1, reference numeral 1 denotes a core body, reference numeral 2 denotes a tensile body, and reference numeral 3 denotes a canvas.

The core body 1 is made of an annular flat portion 1*a* which is formed to be substantially flat and semicircular curved portions 1*b* and 1*c* provided on both sides of this flat portion 1*a*, and has a C-shaped cross section as a whole, as shown in FIG. 1. This core body 1 constitutes an essential part of a handrail and is formed from a thermoplastic elastomer material. For the core body 1, in general, materials having appropriate hardness are selected according to the purpose (functions given to the core body 1 and the like) and manufacturing method, and the whole is composed of a plurality of layers. For example, polyurethane-based, polystyrene-based, polyvinyl chloride-based, polyester-based, and polyolefin-based materials are used as raw materials for an elastomer.

The tensile body 2 is intended for preventing the elongation of a handrail by giving a prescribed tensile strength to the core body 1, i.e., the handrail. This tensile body 2 is continuously provided in the interior of the flat portion 1*a* of the core body 1 along the longitudinal direction of the handrail. For example, a steel strip and a wire made of metal are used as materials for the tensile body 2.

The canvas 3 is provided as means for reducing frictional resistance so that the handrail moves smoothly on a handrail guide on a balustrade and as means for obtaining a prescribed frictional force between the canvas and a handrail driving unit (for example, a driving roller) in causing the handrail to be frictionally driven. This canvas 3 is continuously provided in the longitudinal direction of the core body 1 along an inner surface of the core body 1 having a C-shaped cross section so as to be integrated with the core body 1. That is, also the canvas 3 has a C-shaped cross section and is arranged so as to cover each inner surface of the flat portion 1*a* and curved portions 1*b* and 1*c* of the core body 1. For example, cotton and synthetic fibers such as polyester are used as materials for the canvas 3.

Incidentally, when the core body 1 is formed from a material which is not a thermoplastic elastomer, in general, a reinforcement fabric is provided in the interior of the core body 1. However, in the handrail shown in FIG. 1, no reinforcement fabric is used in the interior of the core body 1 and the canvas 3 having also the function of the above-described reinforcement fabric is provided on the inner surface of the core body 1.

The handrail having the above-described construction is fabricated by cutting a handrail main body, which is formed linearly, to a prescribed length and thereafter connecting both end portions of this handrail main body into an annular shape. Hereinafter, a description will be given of the construction of a portion of an annularly formed handrail where both end portions of the handrail main body are connected (a connection).

Figure 2:
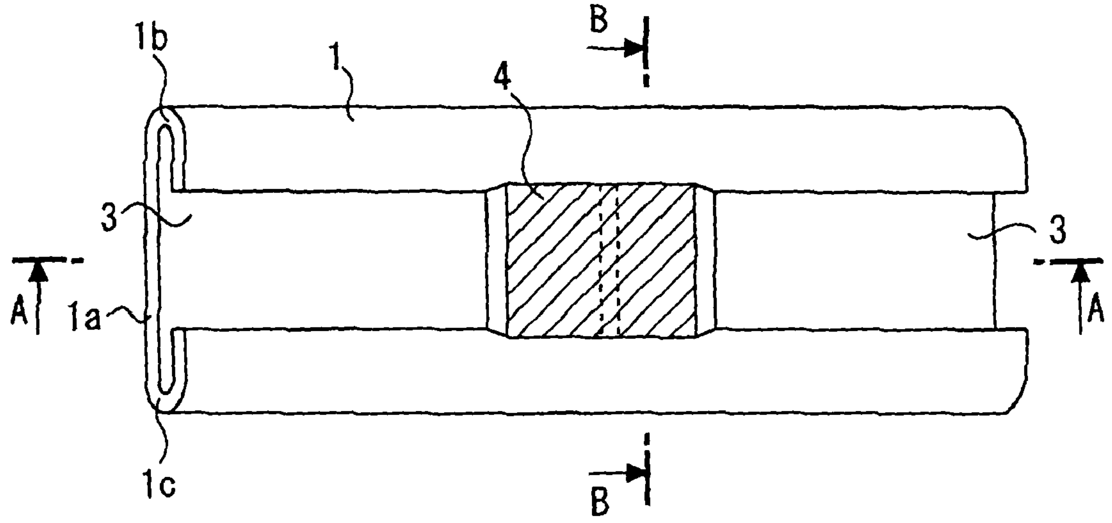
FIG. 2 is a partial block diagram of a handrail for passenger conveyor in First Embodiment of the present invention.
Figure 3:
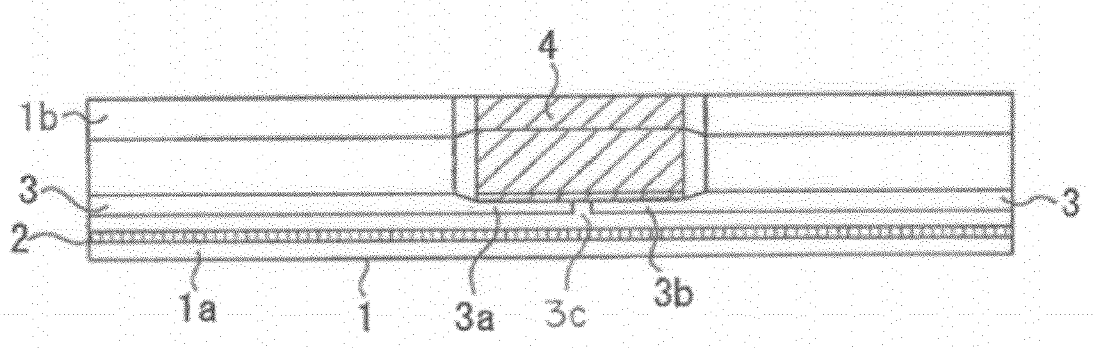
FIG. 3 is an A-A sectional view of the handrail for passenger conveyor shown in FIG. 2.

FIG. 2 is a partial block diagram of a handrail for passenger conveyor in First Embodiment of the present invention and shows a connection of a handrail. FIG. 3 is an A-A sectional view of the handrail for passenger conveyor shown in FIG. 2, and FIG. 4 is a B-B sectional view of the handrail for passenger conveyor shown in FIG. 2.

Figure 4:
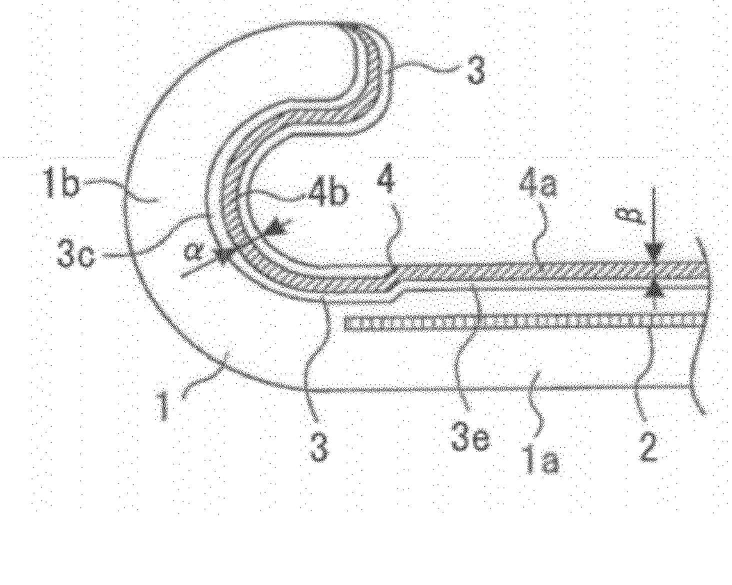
FIG. 4 is a B-B sectional view of the handrail for passenger conveyor shown in FIG. 2.

In FIGS. 2 to 4, reference numerals 3*a* and 3*b* denote longitudinal end portions of the canvas 3, which are arranged adjacent to each other in a connection of the handrail. That is, the end portions 3*a* and 3*b* themselves of the canvas 3 are not continuously provided in an integrated manner in the longitudinal direction of the handrail. Incidentally, the end portions 3*a* and 3*b* of the canvas 3 may be arranged in a condition in which the end portions 3*a* and 3*b* are abutted against each other or may also be arranged in a condition in which there is a small gap 3*f* as shown in FIGS. 2 and 3.

The above-described canvas 3 is such that only the surfaces of the end portions 3*a* and 3*b* are formed to be indented toward the core body 1 side compared to the surfaces of other portions. Incidentally, the surfaces of the portions of the canvas 3 other than the above-described end portions 3*a* and 3*b* form the inner surface of the handrail. The end portions 3*a* and 3*b* are formed in such a manner that portions corresponding to the curved portions 1*b* and 1*c* of the core body 1 (hereinafter referred to as "curved portions 3*c* and 3*d*" (however, the curved portion 3*d* is not shown)) are formed to come to a condition in which the curved portions 3*c* and 3*d* are ever more indented than the surface of a portion corresponding to the flat portion 1*a* (hereinafter referred to as a "flat portion 3*e*"). That is, the end portions 3*a* and 3*b* are formed in such a manner that the amount of an indentation $\alpha$ of the surfaces of the curved portions 3*c* and 3*d* is larger than the amount of an indentation $\beta$ of the surface of the flat portion 3*e* ($\alpha>\beta$).

And between the above-described end portions 3*a* and 3*b* of the canvas 3, an application cloth 4 is fixed by bonding from the inner side of the handrail. This application cloth 4 is arranged so as to cover and hide the whole of a gap formed between the end portions 3*a* and 3*b* from the inner side of the handrail. Incidentally, the application cloth 4 is formed with a prescribed width (the longitudinal distance of the handrail), and is arranged so that the whole thereof is housed within the end portions 3*a* and 3*b* having surfaces receding toward the core body 1 side.

The above-described application cloth 4 has a prescribed thickness and is arranged in such a manner that the surface of a portion corresponding to the flat portion 1*a* of the core body 1 (hereinafter referred to as a "flat portion 4*a*" of the application cloth 4) is substantially flush with each surface of the canvas 3 arranged adjacent to the longitudinal direction of the handrail. Incidentally, the application cloth 4 has a substantially constant thickness all over. For this reason, by being fixed by bonding between the end portions 3*a* and 3*b* of the canvas 3, the application cloth 4 is arranged in such a manner that surfaces of portions corresponding to the curved portions 1*b* and 1*c* of the core body 1 (hereinafter referred to as "curved portions 4*b* and 4*c*" of the application cloth 4 (however, the curved portion 4*c* is not shown)) are a little indented with respect to each surface of the canvas 3 arranged adjacent in the longitudinal direction of the handrail. That is, the inner surface of the handrail is formed in such a manner that only the curved portions 4*b* and 4*c* of the application cloth 4 become more indented than other portions.

Figure 5:
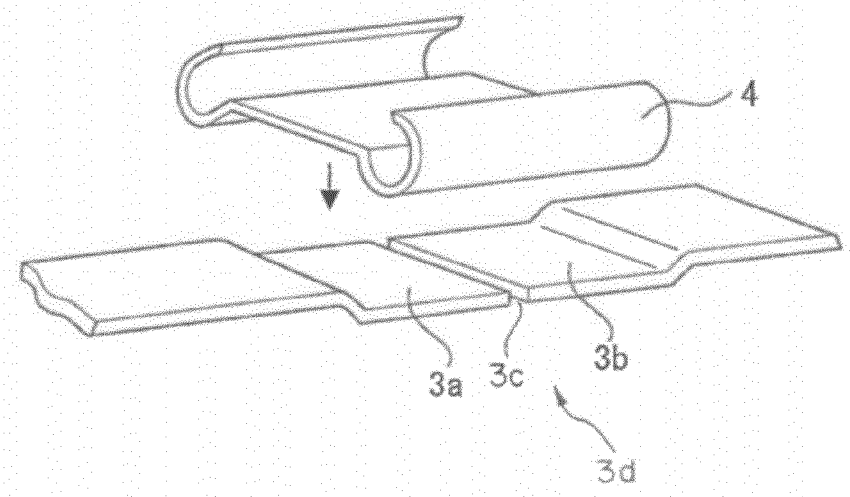
FIG. 5 is a partial perspective view of the handrail for passenger conveyor in First Embodiment of the present invention.

Incidentally, FIG. 5 is a partial perspective view of the handrail for passenger conveyor in First Embodiment of the present invention and shows part of the canvas 3 and the application cloth 4 as observed in the formation of a junction 3*g* of the canvas 3.

According to First Embodiment of the present invention, the application cloth 4 is fixed by bonding between the adjacent end portions 3*a* and 3*b* of the canvas 3 and, therefore, it is possible to give a prescribed strength to the junction of the canvas 3. Therefore, the phenomenon that forces are concentrated on the above-described junction due to the bending of the handrail does not occur, and it becomes possible to positively prevent problems such as the cracking of the core body 1.

The application cloth 4 provided between the end portions 3*a* and 3*b* of the canvas 3 is arranged in such a manner that the surface of the flat portion 4*a* thereof is substantially flush with each surface of the canvas 3 adjacent in the longitudinal direction of the handrail. For this reason, vibrations and noises are not generated even when a driving roller having a diameter of the order of 100 to 200 mm passes by the junction of the canvas 3.

Furthermore, the above-described application cloth 4 is formed in such a manner that the surfaces of the curved portions 4*b* and 4*c* are more indented with respect to each surface of the canvas 3 adjacent in the longitudinal direction of the handrail. For this reason, it is possible to prevent the stripping of the application cloth 4 which might occur due to the use of the passenger conveyor. That is, the stripping of the application cloth 4 occurs due to the contact of the application cloth 4 with a side surface of the driving roller or the handrail guide. It is the curved portions 4*b* and 4*c* of the application cloth 4 that have a high possibility of coming into contact with the side surface of the driving roller and the like. Because in the handrail of the above-described construction, the surfaces of the curved portions 4*b* and 4*c* are formed to be more indented, the phenomenon that during the operation of the passenger conveyor the side surface of the driving roller and the handrail guide come into contact with the curved portions 4*b* and 4*c* does not occur, and it is possible to positively prevent the stripping of the application cloth 4.

Incidentally, in First Embodiment, the description was given of the case where only the surfaces of the curved portions 4*b* and 4*c* of the application cloth 4 are formed to be more indented. However, also the surfaces of the canvas 3 adjacent to the curved portions 4*b* and 4*c* may be formed to be more indented over a certain length. Also in First Embodiment, the description was given of the construction of the connection of the handrail. However, the junction of the canvas 3 exists in portions other than the connection. It is needless to say that the same effect is obtained by providing the same construction as described above also in the junction of the canvas 3 provided in a portion other than the connection of the handrail.

Second Embodiment

Figure 6:
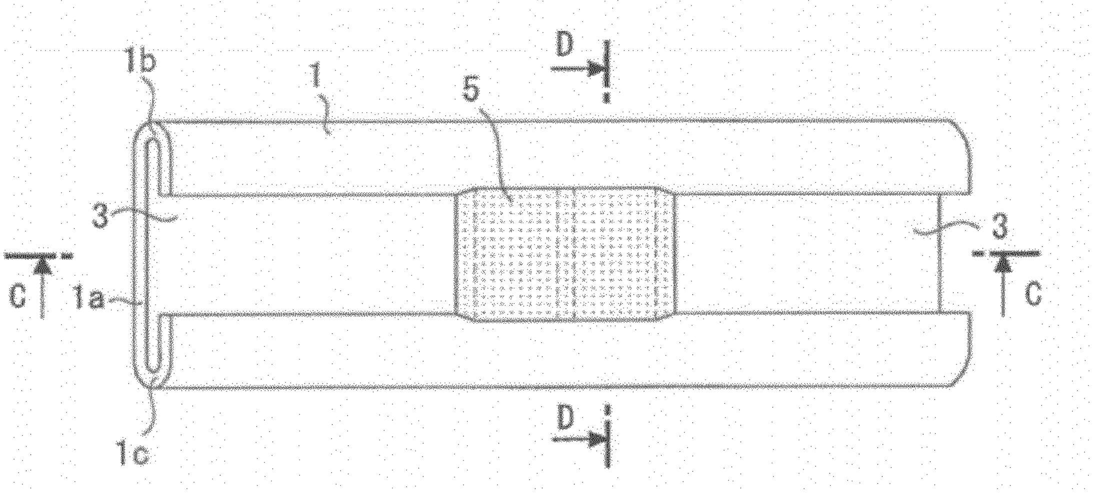
FIG. 6 is a partial block diagram of a handrail for passenger conveyor in Second Embodiment of the present invention.
Figure 7:
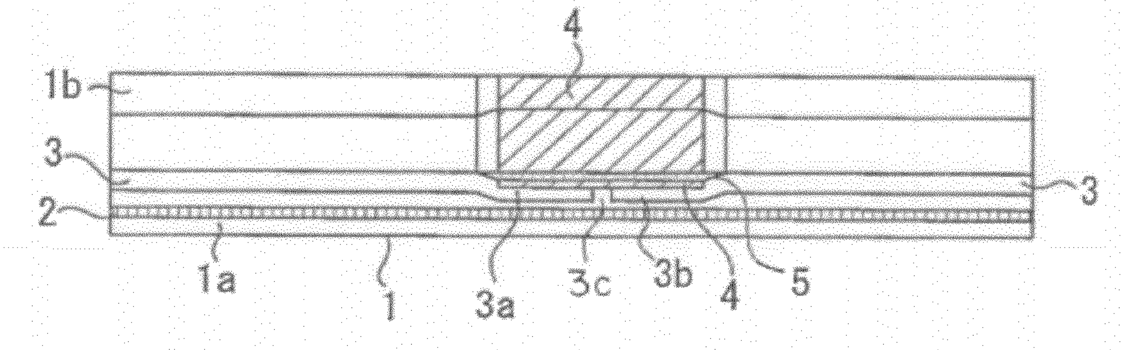
FIG. 7 is a C-C sectional view of the handrail for passenger conveyor shown in FIG. 6.

FIG. 6 is a partial block diagram of a handrail for passenger conveyor in Second Embodiment of the present invention and shows a connection of the handrail as with FIG. 2. FIG. 7 is a C-C sectional view of the handrail for passenger conveyor shown in FIG. 6, and FIG. 8 is a D-D sectional view of the handrail for passenger conveyor shown in FIG. 6.

Figure 8:
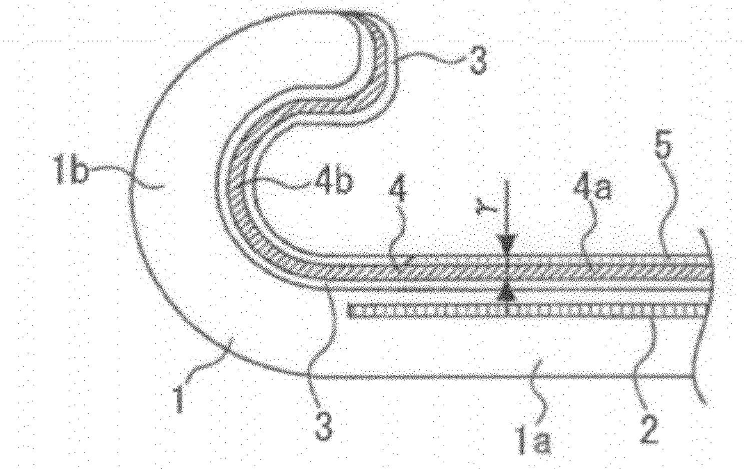
FIG. 8 is a D-D sectional view of the handrail for passenger conveyor shown in FIG. 6.

In FIGS. 6 to 8, a canvas 3 forming an inner surface of the handrail is formed in such a manner that only surfaces of end portions 3*a* and 3*b* are more indented toward the core body 1 side than other portions. However, unlike the case of First Embodiment, the end portions 3*a* and 3*b* are formed in such a manner that the surface of the whole thereof recedes toward the core body 1 side by the distance $\gamma$ compared to the surfaces of other portions (portions of the canvas 3 other than the end portions 3*a* and 3*b*). Incidentally, the amount of an indentation $\gamma$ of the end portions 3*a* and 3*b* is formed to be larger than the thickness of the application cloth 4.

And so as to cover and hide the whole of a gap formed between the above-described end portions 3*a* and 3*b* from the inner side of the handrail, the application cloth 4 is fixed by bonding between the end portions 3*a* and 3*b* from the inner side of the handrail. Incidentally, as described above, the amount of an indentation $\gamma$ on the surfaces of the end portions 3*a* and 3*b* is larger than the thickness of the application cloth 4. For this reason, the application cloth 4 is arranged in such a manner that the surface of the whole thereof is slightly indented with respect to each surface of the canvas 3 arranged adjacent in the longitudinal direction of the handrail.

Reference numeral 5 denotes a non-woven fabric fixed by bonding on the surface of a flat portion 4*a* of the application cloth 4 from the inner side of the handrail. This non-woven fabric 5 has a prescribed thickness, and is arranged in such a manner that the surface thereof is substantially flush with each surface of the canvas 3 arranged adjacent in the longitudinal direction of the handrail. Incidentally, to ensure that no stepped portion is generated between the surface of the non-woven fabric 5 and the surface of the canvas 3 arranged adjacent in the longitudinal direction of the handrail, the non-woven fabric 5 is formed in such a manner that both end portions thereof become thinner as the two end portions approach the tip in accordance with the inclination of the canvas 3. In other respects, Second Embodiment has the same construction as First Embodiment.

Also with the above-described construction, it is possible to produce the same effect as in First Embodiment. However, in general, the above-described non-woven fabric 5 does not have strength equivalent to that of the application cloth 4. For this reason, when the passenger conveyor is used for a long period, the non-woven fabric 5 might be broken and collapse gradually. However, because the non-woven fabric 5 alone disintegrates into fine fibers, the phenomenon that the application cloth 4 is stripped away together does not occur. Even when the non-woven fabric 5 is broken, in the boundary part between the application cloth 4 and the canvas 3 the driving roller does not come into strong contact and, therefore, the phenomenon that all of the non-woven fabric 5 is stripped away does not occur. Therefore, there will not occur the phenomenon that an extreme stepped portion is generated in the above-described boundary part due to the remaining of the non-woven fabric 5 on the surface of the canvas 3, and it is possible to reduce vibrations and noises even when the driving roller passes by the junction of the canvas 3.

INDUSTRIAL AVAILABILITY

As described above, according to the handrail for passenger conveyor related to the present invention, it is possible to give a prescribed strength to the junction of the canvas and it is possible to prevent vibrations and noises which might be generated when the driving roller passes by the junction of the canvas. Therefore, the present invention can be applied to all handrails for passenger conveyor so long as the core body is formed from a thermoplastic elastomer material and a canvas is provided on the inner surface of the core body.

The invention claimed is:

1. A handrail for passenger conveyor, comprising:

an elongated annular core body which is formed from a thermoplastic elastomer material and has a C-shaped cross section by having a flat portion and curved portions provided on both sides of the flat portion in a direction transverse to a longitudinal direction of the core body;

a tensile body provided in the interior of the core body and extending in the longitudinal direction of the core body to give a prescribed tensile strength to the core body;

a canvas which has a C-shaped cross section by being provided along an inner surface of the core body, wherein the canvas has end portions in the longitudinal direction of the core body, the end portions being adjacent to form a junction, and in which an inner surface of the canvas at each of the adjacent end portions of the canvas at the junction is formed to be indented toward the core body compared to surfaces of other portions of the inner surface of the canvas, other than the end portions; and an application cloth which is provided between the end portions of the canvas so as to cover a gap between the end portions of the canvas, wherein a surface of a portion of the application cloth corresponding to the flat portion of the core body is arranged to be flush with the surfaces of the other portions which form the inner surface of the canvas and a surface of a portion of the application cloth corresponding to the curved portion of the core body is arranged to be indented with respect to the inner surface of the canvas at the curved portions of the end portions.

2. The handrail for passenger conveyor according to claim 1, wherein the amount of the indentation of the portion of the application cloth corresponding to the curved portions of the core body at the end portions, with respect to the inner surface of the canvas at the curved portions of the end portions, is larger than the amount of the indentation of the portion corresponding to the flat portion of the core body with respect to the surfaces of other portions of the inner surface of the canvas, other than the end portions; and the application cloth has a thickness which is constant all over the area of the application cloth.

3. A handrail for passenger conveyor, comprising:

an elongated annular core body which is formed from a thermoplastic elastomer material and has a C-shaped cross section by having a flat portion and curved portions provided on both sides of the flat portion in a direction transverse to a longitudinal direction of the core body;

a tensile body provided in the interior of the core body and extending in the longitudinal direction of the core body to give a prescribed tensile strength to the core body;

a canvas which has a C-shaped cross section by being provided along an inner surface of the core body, wherein the canvas has end portions in the longitudinal direction of the core body, the end portions being adjacent to form a junction, and in which an inner surface of the canvas at each of the adjacent end portions of the canvas at the junction is formed to be indented toward the core body compared to surfaces of other portions of the inner surface of the canvas, other than the end portions;

an application cloth which is provided between the end portions of the core body so as to cover a gap between end portions of the canvas and whose surface is arranged to be indented with respect to the surfaces of other portions which form the inner surface of the canvas; and a non-woven fabric which is provided in a portion of the application cloth corresponding to the flat portion of the core body and whose surface is flush with the inner surface of the canvas at the curved portions of the end portions.

* * * * *